United States Patent Office 3,709,962
Patented Jan. 9, 1973

3,709,962
β-PHENYLETHYL ESTERS OF O-ALKYL-O-PHENYLTHIONOTHIOLPHOSPHORIC ACIDS
Gerhard Schrader, Wuppertal-Cronenberg, and Ingeborg Hammann, Cologne, Germany, assignors to Farbenfabriken Bayer Aktiengesellschaft, Leverkusen, Germany
No Drawing. Filed Mar. 30, 1970, Ser. No. 24,019
Claims priority, application Germany, Apr. 3, 1969, P 19 17 164.3
Int. Cl. C07f 9/12; A01n 9/36
U.S. Cl. 260—949          5 Claims

ABSTRACT OF THE DISCLOSURE

β-Phenylethyl esters of O-alkyl-O-phenylthionothiolphosphoric acids which possess insecticidal and acaricidal properties and process for their production.

---

The present invention relates to and has for its objects the provision of particular new β-phenylethyl esters of O - alkyl-O-phenylthionothiolphosphoric acids, i.e. the optionally chloro-substituted phenylethyl ester of a lower O-alkyl-O-phenyl or substituted phenylthionothiolphosphoric acid, which possess insecticidal and acaricidal properties, active compositions in the form of mixtures of such compounds with solid and liquid dispersible carrier vehicles, and methods for producing such compounds and for using such compounds in a new way especially for combating arthropods, e.g. insects and acarids, with other and further objects becoming apparent from a study of the within specification and accompanying examples.

From German patent specifications 949,231 and 1,018,053, as well as U.S. patent specification 3,156,718, there are already known optionally chlorinated S-benzyl esters of O,O-dialkythiolphosphoric acids. According to the particulars given in these specifications, these compounds are distinguished by good insecticidal and acaricidal effectiveness, with simultaneous low toxicity to warm-blooded animals; they are therefore used as pesticides in crop protection and in the hygiene field.

Furthermore, there are described in Germany Auslegeschrift 1,252,961 fungicidal mixtures for use in agriculture which contain, as active component, symmetrical O, O - dialkyl-S-(ω-phenyl-alkyl)-thiolphosphoric acid esters with 2 to 10 carbon atoms in the S-alkyl radical.

It has now been found, in accordance with the present invention, that the particular new β-phenylethyl esters of O-alkyl-O-phenylthionothiolphosphoric acids of the formula:

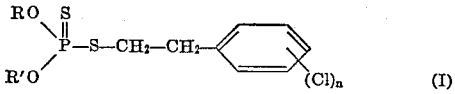

(I)

in which
R is lower alkyl
R' is phenyl which may be substituted by one or more of halo, lower alkyl, lower alkylmercapto, and lower alkoxy, and
n is 0 or 1,
exhibit strong insecticidal and acaricidal properties and sometimes fungitoxic effects as well.

It has been furthermore found, in accordance with the present invention, that the particular new compounds of Formula I above may be produced by the process which comprises reacting an O-alkyl-O-phenylthionothiolphosphoric acid of the general formula

(II)

in the form of the alkali metal or ammonium salt or in the presence of an acid-binding agent with a β-phenylethyl halide of the general formula

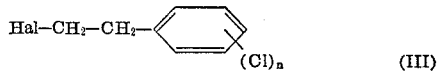

(III)

In Formulae II and III the symbols, R, R' and n have the significance given earlier, whilst Hal is halogen.

It has been found that the compounds of Formula I are distinguished by outstanding insecticidal and acaricidal properties; they possess both a very good action against biting insects and also sucking insects, and an excellent activity against spider mites and ticks, and furthermore in part also have a good fungitoxic side-effect.

The course of the reaction according to the invention is illustrated by the following formula scheme:

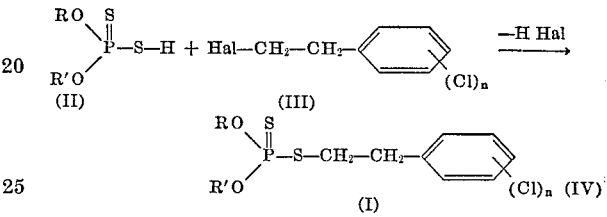

wherein R, R', Hal and n have the meanings given above, and M is a monovalent metal equivalent or ammonium.

Surprisingly, the active compounds of Formula I above, according to the present invention, show a considerably higher insecticidal and acaricidal activity than the previously known compounds of analogous structure and the same type of activity. The active compounds according to the present invention, therefore, represent a valuable contribution to the art.

Advantageously, in accordance with the present invention, in the various formulae herein:

R is alkyl with 1 to 4 carbon atoms, such as methyl, n-propyl, iso-propyl, n-butyl, iso-butyl, or sec.-butyl; most preferably it is ethyl; and
R' is preferably phenyl, mono-, di- or trihalophenyl, lower alkylphenyl, lower alkylmercaptophenyl, lower alkyl-lower alkylmercaptophenyl, lower alkoxyphenyl or lower alkylhalophenyl, more preferably is phenyl, monochlorophenyl, dichlorophenyl, methylmercaptophenyl, methylmethylmercaptophenyl, methylchlorophenyl, tolyl or tert.-butylphenyl, and most preferably is methylmercaptophenyl and monochlorophenyl.

The O-alkyl-O-phenylthionothiolphosphoric acids of Formula II required as starting materials for the reaction are in part known from the literature. They can be manufactured industrially in the form of their salts according to customary methods, for example by reaction of the corresponding O - alkyl-O-phenylthionophosphoric acid halides with alkali metal (preferably potassium or sodium) hydrogen sulfides. The reaction preferably takes place in alcoholic solution at room temperature or slightly elevated temperature.

As suitable starting materials, the following O-alkyl-O-phenylthionothiophosphoric acids are mentioned by way of example:
ethyl-O-phenyl-,
 -O-(2-chlorophenyl-)-,
 -O-(3-chlorophenyl-)-,
 -O-(4-chlorophenyl-)-,
 -O-(2,4- and 2,5-dichlorophenyl-)-,
 -O-(2,4,5- and 2,4,6-trichlorophenyl-)-,
 -O-(2-chloro-4-methyl-phenyl-)-,
 -O-(3-chloro-4-methylpenyl-)-,
 -O-(3-methyl-4-chlorophenyl-)-,
 -O-(2-methyl-4-chlorophenyl-), -O-(2-chloro-4-tert.-butyl-phenyl-)-,
-O-(2-chloro-4-tert.-butoxy-phenyl-)-,
-O-(4-methoxy-phenyl-)-,
-O-(3-methoxy-phenyl-)-,
-O-(2-methoxy-phenyl-)-,
-O-(4-tolyl-)-,
-O-(4-tert.-butyl-phenyl-)-,
-O-(4-methylmercapto-phenyl-)-, and
-O-(3-methyl-4-methylmercapto-phenyl-)-
thionophosphonic acid ester chloride or bromide as well as the corresponding methyl, n-propyl, isopropyl, and n-, iso- and tert.-butyl compounds. The β-phenylethylhalides of Formula III are also known from the literature.

As examples of starting materials (III), there are mentioned in particular:

β-phenyl-ethyl-,
-(2-chlorophenyl-)-ethyl-,
-(3-chlorophenyl-)-ethyl-,
-(4-chlorophenyl-)-ethyl chloride as well as the corresponding bromides.

The reaction is preferably carried out in the presence of a solvent which term includes a mere diluent. Practically all organic solvents or mixtures thereof are suitable for this purpose. These include aliphatic or aromatic (possibly chlorinated) hydrocarbons, such as benzine, methylene chloride, benzene, toluene, chlorobenzene, xylene; ethers, for example diethyl or di-n-butyl ether, dioxan or tetrahydrofuran; and low-boiling aliphatic alcohols, ketones and nitriles, for example methanol, ethanol, isopropanol, butanol, acetone, methylethyl ketone, methylisopropyl ketone, methylisobutyl ketone, acetonitrile and propionitrile.

The reaction can be carried out within a fairly wide temperature range. In general, it is carried out at 20 to 100° C. (or the boiling point of the mixture), preferably 40 to 80° C.

As can be seen from formula scheme (IV), one mol of acid-binding agent and one mol of β-phenylethyl halide are generally required per mol of O-alkyl-O-phenylthionothiolphosphoric acid. At the same time it has proved advantageous to add the undiluted β-phenylethyl halide with stirring to a solution or suspension of the particular O-alkyl-O-phenylthionothiolphosphoric acid salt, for example in one of the abovementioned solvents, preferably acetonitrile, and to heat the reaction mixture subsequently, generally at the abovementioned temperature, for sufficient time (generally 1 to 3 hours) in order to complete the reaction. With this procedure, the products may be obtained in outstanding yields and in excellent purity.

The working up of the mixture may take place in the customary manner, that is, by cooling it and taking it up in a suitable solvent, preferably a hydrocarbon such as benzene, separating the phases, washing and drying the organic layer, evaporating the solvent and, where appropriate, fractionally distilling the residue.

The O-alkyl-O-phenylthionothiolphosphoric acid esters according to the invention are obtained in most cases in the form of colorless to slightly colored water-insoluble oils which cannot be distilled without decomposition even under greatly reduced pressure. They can, however, be purified by brief heating to moderately elevated temperatures in a vacuum to remove the last volatile components.

As already mentioned above, the products according to the invention are distinguished by outstanding insecticidal and acaricidal effectiveness; they possess a very high activity against eating and biting insects and an excellent effectiveness against spider mites and ticks, further in some cases, there is good fungitoxic activity as well. They possess only a low phytotoxicity. The pesticidal effect sets in rapidly and is long-lasting. By reason of these properties the new β-phenylethyl esters of O-alkyl-O-phenylthionothiolphosphoric acids may be used in crop protection and in protection of stored products, as well as in the hygiene field, for the control of harmful sucking and eating insects as well as mites and phytopathogenic fungi.

To the sucking insects there belong, in the main, aphids (Aphidae) such as the green peach aphid (*Myzus persicae*), the bean aphid (*Doralis fabae*), the bird cherry aphid (*Phopalosiphum padi.*), the pea aphid (*Macrosiphum pisi*), and the potato aphid (*Macrosiphum solanifolii*), the current gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example, the oleander scale (*Aspidiotus hederae*), and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus;* and the like.

In the case of the biting insects contemplated herein, above all should be mentioned butterfly caterpillars (Lepidoptera) such as the diamond-back moth (*Plutella maculipennis*), the gipsy moth (*Lymantria dispar*), the brown-tailed moth (*Euproctis chrysorrhoea*) and the tent caterpillar (*Malacosoma neustria*); further, the cabbage moth (*Mamestra brassicae*) and the cutworm (*Agrotis segetum*), the large white butterfly (*Pieris brassicae*), the small winter moth (*Chiematobia brumata*), the green oak tortrix moth (*Tortrix viridana*), the fall armyworm (*Laphygama frugiperda*) and the cotton worm (*Prodenia litura*), the ermine moth (*Ephistia Kuhniella*) and the greater wax moth (*Galleria mellonella*); and the like.

Also to be classed with the biting insects contemplated herein are beetles (Coleoptera), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochlearia*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebrio molitor*), and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta amercana*), Madeira cockroach (*Ltucophaea or Rhyparobia madeirae*), Oriental cockroach (*Blatta orientalis*), the giant cockroach (*Blaberus giganteus*) and the black giant cockroach (*Blabeus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example, the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and the bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius-Tetranychus althaeae* or *Tetranychus urticae*) and the European red mite (*Para-tetranychus pilosus* - *Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally ticks, such as the relapsing fever tick (*Ornithodorus moubata*); and the like.

When used against hygiene pests and pests of stored products, particularly flies and mosquitoes, the new compounds are also distinguished by an outstanding residual effect on timber and clay as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alky arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compound can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, anr more particularly arthropods, e.g. insects and acarids, which comprise applying to such pests, i.e. at least one of such arthropods or the corresponding habitat thereof, i.e. locus to be protected, a pesticidally, i.e. an arthropodicidally, e.g. insecticidally and acricidally, effective or toxic amount of the particular active compound of the invention alone or together with a carrier vehicle as noted above. The instant formulations or compositions are applied in the usual manner, for instance by spraying, atomizing, vaporizing, fumigating, scattering, dusting, watering, squirting, sprinkling, pouring and the like.

It will be realized, of course, that in connection with the insecticidal and acaricidal use of the instant compounds, the concentration of the particular active compound utilized, above or in admixture with the carrier vehicle, will depend upon the intended application, as the artisan will appreciate, and may be varied within a fairly wide range depending upon the weather conditions and the purpose for which the compound is used. Therefore, in special cases, it is possible to go above or below the aforementioned concentration ranges and amounts per unit weight and volume.

The effectiveness of the particular compounds of the present invention are illustrated, without limitation, by the following examples:

EXAMPLE 1

*Phaedon larvae* test

Solvent: 3 parts by weight acetone
Emulsifier: 1 part by weight alkylaryl polyglycol ether To produce a suitable preparation of the particular active compound, 1 part by weight of the active compound is mixed with the stated amount of solvent containing the stated amount of emulsifier, and the resulting concentrate is diluted with water to the desired final concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compounds, the times of evaluation and the results can be seen from the following Table 1:

with the stated amount of solvent containing the stated amount of emulsifier and the resulting concentrate is diluted with water to the desired final concentration.

Cabbage leaves (Brassica oleracea) are sprayed with the preparation of the active compound until dew moist TABLE 1
[Phaedon larvae test]

| Active compound (constitution) | Active substance concentration in percent | Degree of destruction in percent after 3 days |
|---|---|---|
| $(C_2H_5O)_2\overset{O}{\underset{\|}{P}}-S-CH_2-\bigcirc$ (known) (A) | 0.1 | 0 |
| $(C_2H_5O)_2\overset{O}{\underset{\|}{P}}-S-CH_2-CH_2-\bigcirc$ (known) (B) | 0.1<br>0.01 | 100<br>50 |
| $CH_3-S-\bigcirc-O\underset{C_2H_5O}{\overset{S}{\underset{\|}{P}}}-S-CH_2-CH_2-\bigcirc$ (1) | 0.1<br>0.01<br>0.001 | 100<br>100<br>60 |
| $CH_3-S-\bigcirc-O\underset{C_2H_5O}{\overset{S}{\underset{\|}{P}}}-S-CH_2-CH_2-\bigcirc-Cl$ (2) | 0.1<br>0.01 | 100<br>100 |
| $Cl-\bigcirc-O\underset{C_2H_5O}{\overset{S}{\underset{\|}{P}}}-S-CH_2-CH_2-\bigcirc$ (3) | 0.1<br>0.01<br>0.001 | 100<br>100<br>100 |
| $Cl-\bigcirc-O\underset{C_2H_5O}{\overset{S}{\underset{\|}{P}}}-S-CH_2-CH_2-\bigcirc-Cl$ (4) | 0.1<br>0.01 | 100<br>100 |

EXAMPLE 2

Plutella test

Solvent: 3 parts by weight acetone
Emulsifier: 1 part by weight alkylaryl polyglycol ether To produce a suitable preparation of the active compound, 1 part by weight of the active compound is mixed and are then infested with caterpillars of the diamondback moth (Plutella maculipennis).

After the specified periods of time, the degree of destruction is determined as a percentage: 100% means that all the caterpillars are killed, whereas 0% means that none of the caterpillars are killed.

The active compounds, the concentrations of the active compounds, the evaluation times and the results can be seen from the following Table 2:

TABLE 2
[Plutella test]

| Active compound (constitution) | Active substance concentration in percent | Degree of destruction in percent after 3 days |
|---|---|---|
| $(C_2H_5O)_2-\overset{O}{\underset{\|}{P}}-S-CH_2-CH_2-\bigcirc$ (known) (B) | 0.1<br>0.01 | 100<br>0 |
| $CH_3S-\bigcirc-O\underset{C_2H_5O}{\overset{S}{\underset{\|}{P}}}-S-CH_2-CH_2-\bigcirc$ (1) | 0.1<br>0.01<br>0.001 | 100<br>100<br>80 |

TABLE 2—Continued

| Active compound (constitution) | Active substance concentration in percent | Degree of destruction in percent after 3 days |
|---|---|---|
| (2) $CH_3S-\text{C}_6H_4-O-P(=S)(OC_2H_5)-S-CH_2-CH_2-C_6H_4-Cl$ | 0.1<br>0.01 | 100<br>90 |
| (3) $Cl-C_6H_4-O-P(=S)(OC_2H_5)-S-CH_2-CH_2-C_6H_5$ | 0.1<br>0.01<br>0.001 | 100<br>100<br>50 |
| (4) $Cl-C_6H_4-O-P(=S)(OC_2H_5)-S-CH_2-CH_2-C_6H_4-Cl$ | 0.1<br>0.01 | 100<br>100 |

EXAMPLE 3

Myzus test (contact action)

Solvent: 3 parts by weight acetone
Emulsifier: 1 part by weight alkylaryl polyglycol ether To produce a suitable preparation of active compound 1 part by weight of the active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed, whereas 0% means that none of the aphids are killed.

The active compounds, the concentrations of the active compounds, the evaluation times and the results can be seen from the following Table 3:

TABLE 3
[Myzus test]

| Active compound (constitution) | Active compound concentration in percent | Degree of destruction in percent after 24 hours |
|---|---|---|
| (A) $(C_2H_5O)_2-P(=O)-S-CH_2-C_6H_5$ (known) | 0.1<br>0.01 | 40<br>0 |
| (1) $CH_3S-C_6H_4-O-P(=S)(OC_2H_5)-S-CH_2-CH_2-C_6H_5$ | 0.1<br>0.01<br>0.001 | 100<br>50<br>20 |
| (2) $CH_3S-C_6H_4-O-P(=S)(OC_2H_5)-S-CH_2-CH_2-C_6H_4-Cl$ | 0.1 | 80 |
| (3) $Cl-C_6H_4-O-P(=S)(OC_2H_5)-S-CH_2-CH_2-C_6H_5$ | 0.1<br>0.01 | 98<br>50 |

EXAMPLE 4

Tetranychus test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired final concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed, whereas 0% means that none of the spider mites are killed.

The active compounds, the concentrations of the active compounds, the evaluation times and the results can be seen from the following Table 4:

P, 7.6; S, 15.7; Cl, 17.5. Found (percent): P, 7.6; S, 15.3; Cl, 17.6.

The potassium O-ethyl-O-(3-chlorophenyl)-thionothiolphosphate required as the starting material can, for example, be obtained as follows:

Hydrogen sulfide is introduced into a solution of 95 g. (0.8 mol) of potassium hydroxide in 1000 ml. of ethanol until saturation is reached. 218 g. of O-ethyl-O-(3-chlorophenyl)-thionothiolphosphoric acid chloride are then added dropwise to the reaction mixture while stirring, and the latter is stirred for 30 minutes at 25 to 30° C. The potassium chloride which has separated out is filtered off and the filtrate is evaporated under reduced pressure. On treating the residue with ether, the potassium salt is obtained in the form of white crystals of melting point 189° C. The yield is 140 g., corresponding to 58% of theory.

TABLE 4
[T tranychus test]

| Active compounds | | Active compound concentration in percent | Degree of destruction in percent after 48 hours |
|---|---|---|---|
| 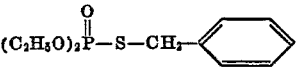 | (A) | 0.1 | 0 |
| (known) | | | |
| 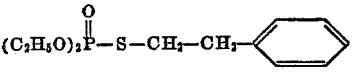 | (B) | 0.1 | 0 |
| (known) | | | |
| 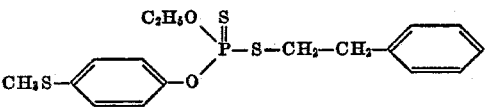 | (1) | 0.1 | 60 |

The following further examples are set forth to illustrate, without limitation, the manner of producing the instant active compounds according to the present invention.

EXAMPLE 5

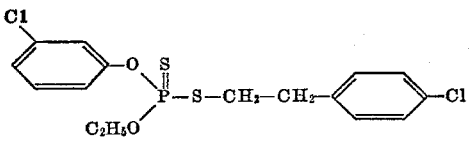
(4)

0.2 molar batch 70 g. of potassium O-ethyl-O-(3-chlorophenyl)-thionothiolphosphate are suspended in 200 ml. of acetonitrile. 44 g. of β-(4-chlorophenyl)-ethyl chloride are added to this suspension at 60° C. while stirring, the mixture is warmed for one hour to 80° C. and then cooled to room temperature, and the reaction mixture is taken up in 300 ml. of benzene. The benzene solution is separated off, washed with water and then dried over sodium sulfate, and after distilling off the solvent, the residue is kept for a short time at a bath temperature of 80° under a pressure of 0.01 mm. Hg. 60 g. (74% of theory) of O-ethyl-O - (3 - chlorophenyl) - S - [β-(4'-chlorophenyl)-ethyl]-thionothiolphosphoric acid ester are obtained in this way as a slightly yellow water-insoluble oil having a refractive index of $n_D^{19}=1.5938$.

Calculated for a molecular weight of 407 (percent):

EXAMPLE 6

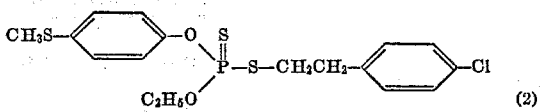
(2)

0.2 molar batch 44 g. of β-(4-chlorophenyl)-ethyl chloride are added dropwise at 60° C. to a suspension of 70 g. of potassium O-ethyl - O - (4-methylmercaptophenyl)-thionothiolphosphate in 200 ml. of acetonitrile while stirring, and the mixture is further heated for one hour to 80° C. and then worked up as in Example 5. 79 g. (94% of theory) of O-ethyl - O - (4-methylmercaptophenyl)-S-[β-(4'-chlorophenyl)-ethyl]-thionothiolphosphoric acid ester are obtained as a slightly yellow water-insoluble oil having a refractive index of $n_D^{10}=1.6118$.

Calculated for a molecular weight of 418.5 (percent): P, 7.4; S, 22.9; Cl, 8.5. Found (percent): P, 7.4; S, 22.5; Cl, 9.5.

The potassium O-ethyl - O - (4-methylmercaptophenyl)-thionothiolphosphate used as the starting substance can, for example, be prepared as follows:

0.8 molar batch 95 g. of potassium hydroxide are dissolved in 1000 ml. of ethanol. Hyrogen sulfide is passed into the solution at 20 to 30° C. until saturation is reached. 227 g. of O-ethyl-O - (4-methylmercaptophenyl)-thionothiolphosphoric acid chloride are then added dropwise to the reaction mixture at 30 to 35° C. while stirring, the latter is stirred for a further 30 minutes, the potassium chloride which has separated out is then filtered off, the filtrate is evaporated under reduced pressure, and on stirring the residue with ether, the salt is obtained in colorless crystals of melting point 190° C. The yield is 180 g. (70% of theory).

EXAMPLE 7

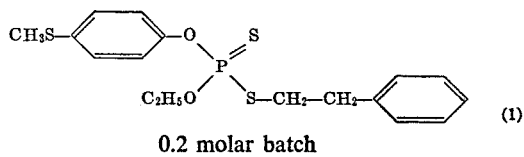

0.2 molar batch 70 g. of potassium O-ethyl-O-(4-methymercaptophenyl)-thionothiolphosphate are suspended in 200 ml. of acetonitrile, 36 g. of β-phenylethyl chloride are added to the mixture at 60° C. while stirring, the mixture is further warmed to 70–80° C. for 2 hours, and the batch is worked up as in Example 5. 41 g. (53.5% of theory) of the O-ethyl-O-(4-methylmercaptophenyl)-S-(β-phenylethyl)-thionothiolphosphoric acid ester are obtained as a yellow water-insoluble oil of refractive index $n_D^{24}=1.5981$.

Calculated for a molecular weight of 384 (percent): P, 8.3; S, 25.0. Found (percent): P, 8.4; S, 24.8.

EXAMPLE 8

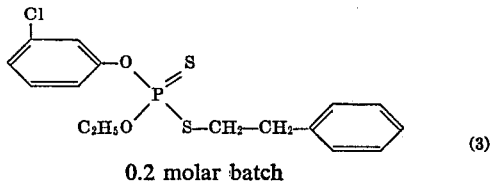

0.2 molar batch 70 g. of potassium O-ethyl-O-(3-chlorophenyl)-thionothiolphosphate are suspended in 200 ml. of acetonitrile. 36 g. of β-phenylethyl chloride are added to this suspension at 40 to 50° C. while stirring, and the batch is further warmed to 70–80° C. for 2 hours and then worked up in the manner described in Example 5. 54 g. (72.5% of theory) of O-ethyl-O-(3-chlorophenyl)-S-(β-phenylethyl)-thionothiolphosphoric acid ester are obtained as a slightly yellow water-soluble oil of refractive index $n_D^{24}=1.5854$.

Calculated for a molecular weight of 372.5 (percent): P, 8.3; S, 17.2; Cl, 9.4. Found (percent): P, 8.5; S, 17.0; Cl, 9.3.

It will be realized by the artisan that all of the foregoing compounds contemplated by the present invention possess the desired pesticidal, especially arthropodicidal, i.e. insecticidal and acaricidal, properties for combating insects, especially eating and biting insects and spider mites and ticks. The new compounds in some cases also have a desirable fungitoxic side-effect.

As may be used herein, the terms "arthropod," "arthropodicidal" and "arthropodicide" contemplate specifically both insects and acarids. Thus, the insects acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount, which in effect means an insecticidally or acaricidally effective amount of the active compound for the desired purposes.

In addition to the specific compounds identified herein, all of the other compounds in accordance with the invention including those obtained by the reactions between compounds II and III as above set forth, will give similar test results to those of the compounds set forth in the Examples 1 to 8 herein above.

It will be appreciated that the instant specification and examples are set forth by way of illustration and not limitation, and that various modifications and changes may be made without departing from the spirit and scope of the present invention.

What is claimed is:

1. β-Phenylethyl esters of O-alkyl-O-phenylthionothiolphosphoric acid esters of the formula

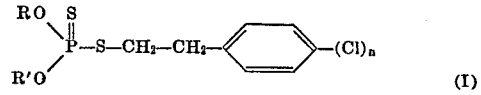

wherein

R is lower alkyl,
R' is phenyl, 4-methylmercaptophenyl or 3-chlorophenyl and
n is 0 or 1.

2. Compound according to claim 1 wherein such compound is O-ethyl-O-(4-methylmercaptophenyl)-S-(β-phenylethyl)thionothiolphosphoric acid ester of the formula

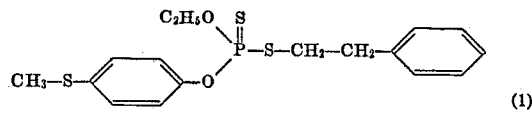

3. Compound according to claim 1 wherein such compound is O-ethyl-O-(4-methylmercaptophenyl)-S-[β-(4'-chlorophenyl)ethyl]-thionothiolphosphoric acid ester of the formula

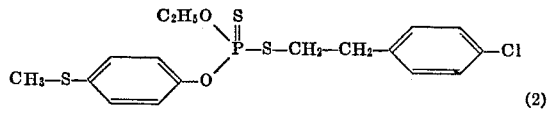

4. Compound according to claim 1 wherein such compound is O-ethyl-O-(3-chlorophenyl)-S-(β-phenylethyl)-thionothiophosphoric acid ester of the formula

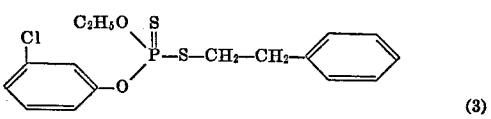

5. Compound according to claim 1 wherein such compound is O-ethyl - O - (3-chlorophenyl)-S-[β-(4'-chlorophenyl)-ethyl]-thionothiolphosphoric acid ester of the formula

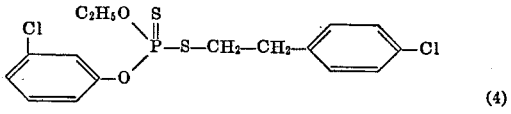

References Cited

UNITED STATES PATENTS 3,156,718   11/1964   Lorenz et al. _____ 260—963 X

LEWIS GOTTS, Primary Examiner

A. H. SUTTO, Assistant Examiner

U.S. Cl. X.R.

260—964; 424—216, 224

PO-1050
(5/69)

UNITED STATES PATENT OFFICE
CERTIFICATE OF CORRECTION

Patent No. 3,709,962      Dated January 9, 1973

Inventor(s) Gerhard Schrader et al.

It is certified that error appears in the above-identified patent and that said Letters Patent are hereby corrected as shown below:

Col. 2, line 60, correct spelling of "phenylthionothiolphosphoric".

Col. 4, line 54, correct spelling of "americana".

Col. 4, line 54, correct spelling of "Leucophaea"

Col. 4, line 57, correct spelling of "Blaberus".

Col. 6, line 33, cancel "anr" and substitute -- and --.

Col. 6, line 37, correct spelling of "acaricidally".

Col. 11, Table 4, in the title - correct spelling of "Tetranychus".

Col. 12, line 59, " $n_D^{10}$ " should be -- $n_D^{19}$ --.

Col. 12, line 69, correct spelling of "Hydrogen".

Col. 13, line 16, change "80%" to -- 80° --.

Col. 13, line 41, change "soluble" to --insoluble--.

Col. 13, line 55, insert -- and -- between "insects acarids".

Col. 14, line 41, correct spelling of "thionothiolphosphoric".

Signed and sealed this 29th day of May 1973.

(SEAL)
Attest:

EDWARD M. FLETCHER, JR.
Attesting Officer

ROBERT GOTTSCHALK
Commissioner of Patents